United States Patent [19]

Ferleger

[11] Patent Number: 5,238,366

[45] Date of Patent: Aug. 24, 1993

[54] METHOD AND APPARATUS FOR DETERMINING TURBINE BLADE DEFORMATION

[75] Inventor: Jurek Ferleger, Longwood, Fla.

[73] Assignee: Westinghouse Electric Corp., Pittsburgh, Pa.

[21] Appl. No.: 909,532

[22] Filed: Jul. 6, 1992

[51] Int. Cl.⁵ .................. F01D 5/00; G01B 21/32
[52] U.S. Cl. ......................... 416/61; 73/760; 415/118
[58] Field of Search ............... 416/61, 191, 219 R; 73/116, 760; 415/118

[56] References Cited

U.S. PATENT DOCUMENTS

| | | | |
|---|---|---|---|
| 1,061,648 | 5/1913 | Westinghouse | 416/191 |
| 3,467,358 | 9/1969 | Zablotsky et al. | 416/61 |
| 4,533,298 | 8/1985 | Partington et al. | 416/191 |
| 4,718,172 | 1/1988 | Rouse et al. | |
| 4,765,046 | 8/1988 | Partington et al. | |
| 4,840,539 | 6/1989 | Bourcier et al. | 416/191 |

FOREIGN PATENT DOCUMENTS 43104 3/1985 Japan ..................... 415/118

Primary Examiner—Edward K. Look
Assistant Examiner—James A. Larson

[57] ABSTRACT

A method and apparatus are provided for determining the amount and type of permanent deformation experienced by a turbomachine blade. According to the invention, small holes are drilled in at least three blades of the blade row. One hole is drilled in the inlet face of the blade shroud and another hole is drilled in the inlet face of the blade root. In addition, third and fourth holes are drilled in the exit face of the shroud and a sixth hole is drilled in the exit face of the root. Measurements are taken between the shroud holes on the middle blade and the root holes on the outer blades in the row on both the inlet and exit faces. The measurements are use to form triangles indicating the blade geometry. By comparing the changes in these triangles after substantial operating time, both the type and amount of permanent deformation can be determined.

20 Claims, 5 Drawing Sheets

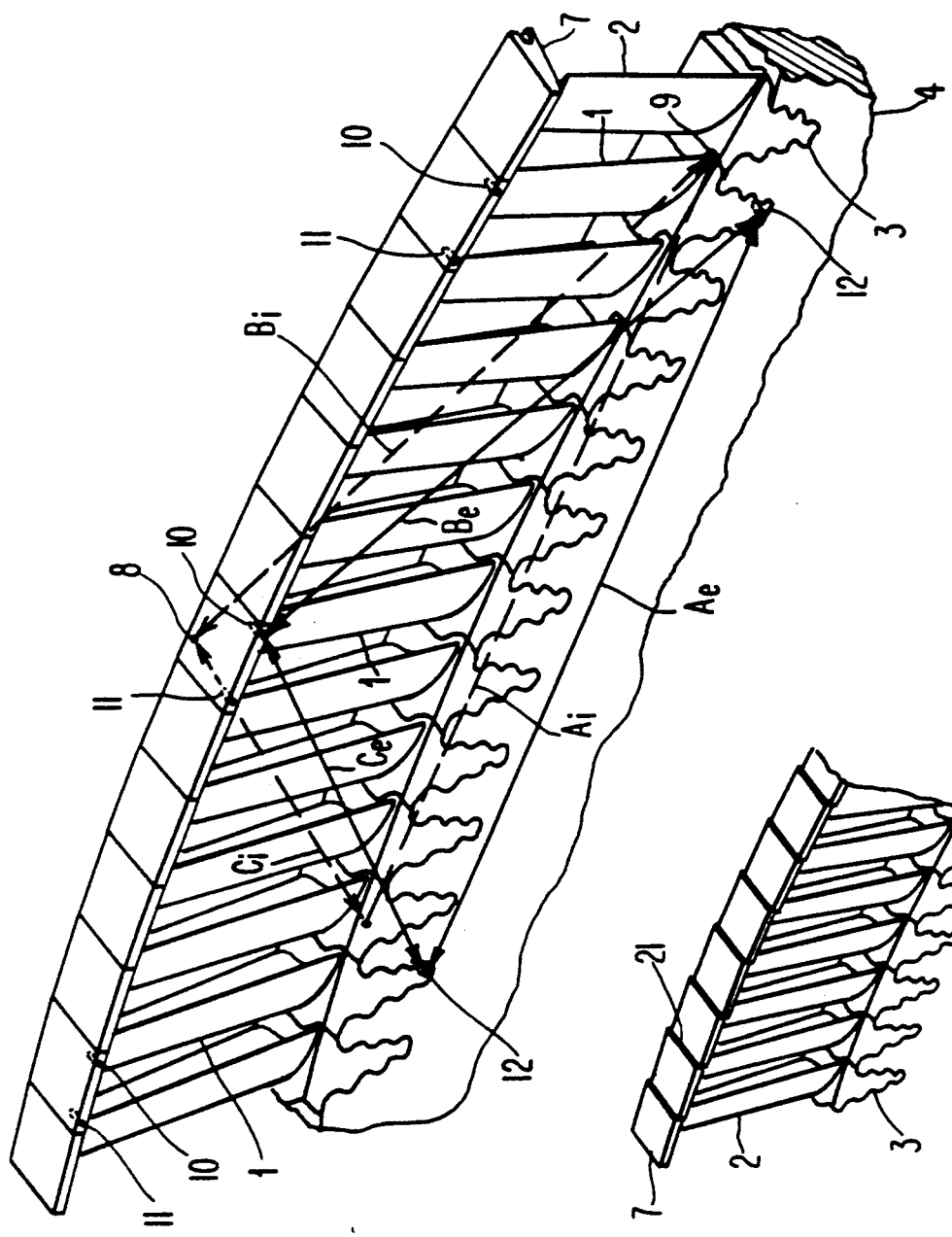
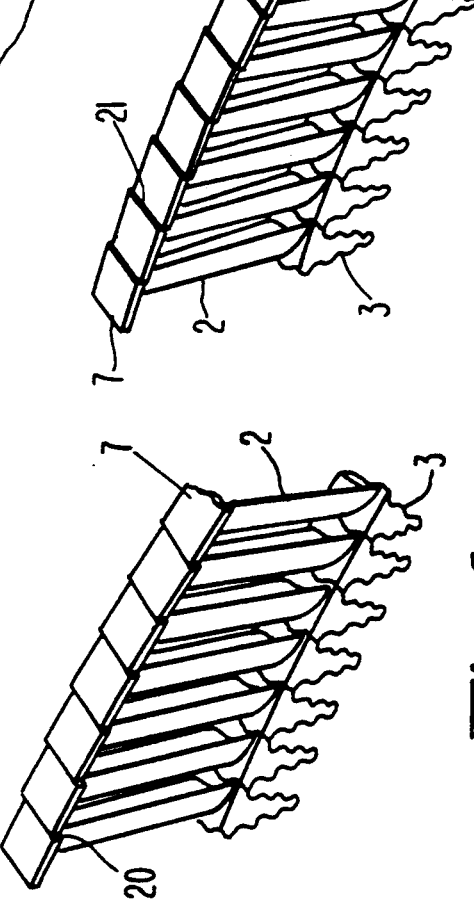
Fig. 3
Fig. 5
Fig. 4

METHOD AND APPARATUS FOR DETERMINING TURBINE BLADE DEFORMATION

BACKGROUND OF THE INVENTION

The present invention relates to the rotor blades of a turbomachine, such as a gas or steam turbine or the like. More specifically, the present invention relates to a method and apparatus for determining the amount and type of permanent deformation that such blades experience as a result of operation.

A turbomachine typically comprises a centrally disposed rotor rotating within a stationary cylinder. A large number of blades are attached at the periphery of the rotor and are arranged in circumferentially extending rows. As a result of the high stress levels experienced by the blades—caused by centrifugal force, gas bending loads and differential thermal expansion—combined with the high temperatures to which they are subjected, turbomachine blades sometimes experience permanent deformation due to creep, especially after long operating times, or due to frictional contact between the surfaces of adjacent blade shrouds. Permanent deformation may also be caused by contact, such as contact with other blades in the row in the case of shrouded blades, contact with the cylinder or the adjacent rows of stationary vanes or with foreign objects.

Quantifying the type and amount of deformation can help one to determine the cause of the deformation, as well as whether the blade can safely be returned to service for continued operation. Unfortunately, due to the complex shape of modern high performance blades and the complex stress patterns to which they are subjected, the deformation may assume a complex configuration. Consequently, it is extremely difficult to quantify and categorize blade deformation. This difficulty is exacerbated by the fact that removal of the blades from the rotor is a time consuming process. Thus, it is preferable to be able to check for blade deformation without removing blades from the rotor.

It is therefore desirable to provide a method and apparatus for determining, in situ, the amount and type of deformation a turbomachine blade has undergone. It would also be desirable to check blade radial position during assembly and after any subsequent manufacturing operation.

SUMMARY OF THE INVENTION

Accordingly, it is the general object of the current invention to provide a method and apparatus for determining, in situ, the amount and type of deformation a turbomachine blade has undergone.

Briefly, this object, as well as other objects of the current invention, is accomplished in a turbomachine having a plurality of blades arranged in a circumferentially extending row around a rotor, each of the blades having a proximal end affixed to the rotor and a distal end, using a method comprising the step of forming a first reference mark on the distal end of a first one the blades, a second reference mark on the proximal end of a second one of the blades, and a third reference mark on the proximal end of a third one of the blades. A further step comprises measuring the distances B and C from the first reference mark to the second and third reference marks, respectively, at a first point in time, re-measuring the distances B' and C' from the first reference mark to the second and third reference marks, respectively, at a second point in time. A further step comprises measuring the distances A and A' between the second and third reference marks at the first and second points in time, respectively. In another step, B and C are compared to B' and C' by forming a first triangle from A,B,C and a second triangle from A',B',C' and determining the difference between said first triangle and second triangles.

In one embodiment of the method each of the blades has an inlet side disposed axially upstream of an exit side, and the step of forming the first, second and third reference marks comprises forming each of the reference marks on the inlet side. This embodiment further comprises the steps of forming a fourth reference mark on the distal end of the first blade on the exit side, a fifth reference mark on the proximal end of the second blade on the exit side, and a sixth reference mark on the proximal end of the third blade on the exit side, and then measuring the distances $B_e$ and $C_e$ from the fourth reference mark to the fifth and sixth reference marks, respectively, at the first point in time, re-measuring the distances $B_e'$ and $C_e'$ from the fourth reference mark to the fifth and sixth reference marks, respectively, at the second point in time.

BRIEF DESCRIPTION OF THE DRAWINGS

FIG. 3 is an isometric view looking at the exit side of a portion of a row of blades, each similar to the blade shown in FIG. 1, showing the measurements taken according to the current invention to determine radial elongation, axial lean, tangential lean and twist types of deformation. Note that for the sake of simplicity, the blades depicted in FIG. 3 have been shown having shrouds with a slightly different shape at their inlet portions, as compared to the blade shown in FIG. 1. It should be understood that the invention is equally applicable to blades having a variety of shroud shapes.

FIGS. 4 is a portion of the blade row shown in FIG. 2, showing individual blade twist about the radial axis type deformation.

FIGS. 5 is a portion of the blade row shown in FIG. 2, showing blade tangential lean type deformation.

DESCRIPTION OF THE PREFERRED EMBODIMENT

Figure 1:
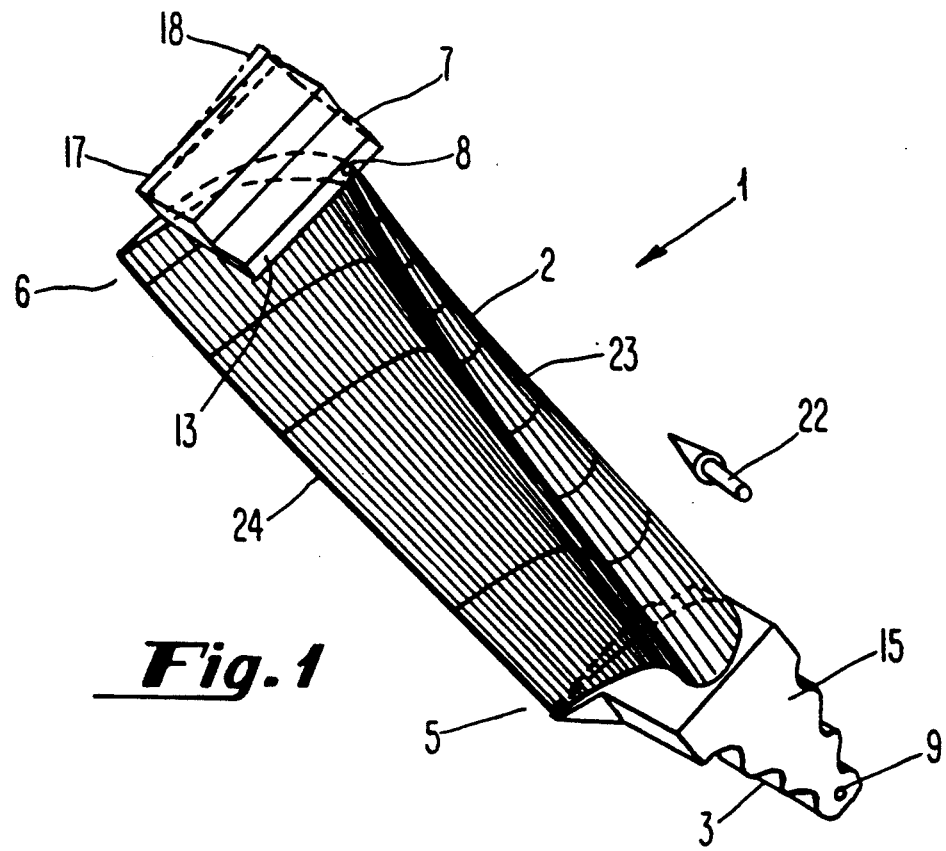
FIG. 1 is an isometric view of a blade modified according to the current invention looking at the inlet side of the blade.

Referring to the drawings, there is shown in FIG. 1 a blade 1 for a turbomachine—specifically, a blade for a steam turbine—that has been modified according to the current invention. A plurality of such blades 1 are attached to the periphery of a rotor 4 and arranged in a circumferential array referred to as a blade row, as shown in FIG. 3. As shown in FIG. 1, each blade 1 is comprised of an airfoil portion 2 and a root portion 3 formed on the proximal end of the blade. The airfoil portion 2 extracts energy from steam 22 that flows axially through the blade row. The root portion 3 serves to fix the blade 1 to the rotor 4. The airfoil 2 has a base portion 5 at its proximal end that is adjacent the root 3 and a tip portion 6 at its distal end. A shroud 7 is integrally formed on the airfoil tip 6. Such an integral shrouded blade is disclosed in U.S. Pat. No. 4,533,298 (Partington et al.), assigned to the same assignee as the current invention and herein incorporated by reference in its entirety.

In order to minimize the stress imposed on the blade 1 and the portion of the rotor 4 to which it is attached, it is important that the blade 1 maintain its symmetry about the blade root and be accurately radially aligned at assembly, as disclosed in U.S. Pat. Nos. 4,718,172 (Rouse et al.) and 4,765,046 (Partington et al.), both of which are assigned to the same assignee as the current invention and herein incorporated by reference in their entirety. However, this symmetry and radial alignment may be lost as a result of permanent deformation occurring as a result of operation of the steam turbine, as previously discussed.

Various types of permanent deformation can occur based on the stress pattern causing the deformation. One undesired type of deformation, referred to as radial elongation type deformation, occurs when the blade airfoils 2 lengthen so that their radial height is increased. Another type, referred to as twist deformation, occurs when the airfoils 2 rotate about their longitudinal axis. As shown in FIG. 4, in shrouded blades this type of deformation creates steps 20 in the exit faces of the shrouds 7. Another type, referred to as tangential lean deformation, occurs when the airfoils 2 bend tangentially about their bases 5. As shown in FIG. 5, in shrouded blades this type of deformation creates steps 21 in the outboard surfaces of the shrouds 7. The apparatus and method of the current invention allow each type of deformation to be determined and its amount quantified. Still another type, referred to as axial lean deformation, occurs when the airfoils 2 bend axially rearward about their bases 5 and may also, if desired, be quantified using the current invention.

Figure 2:
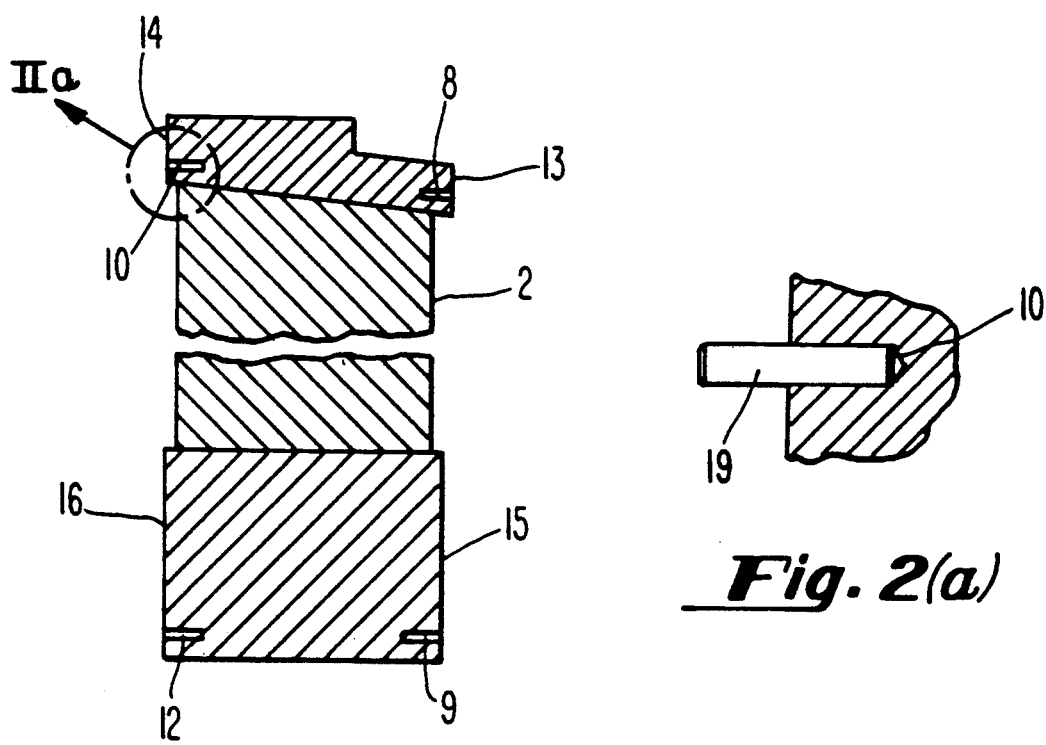
FIG. 2 is a longitudinal cross-section through the blade shown in FIG. 1.
Figure 9:
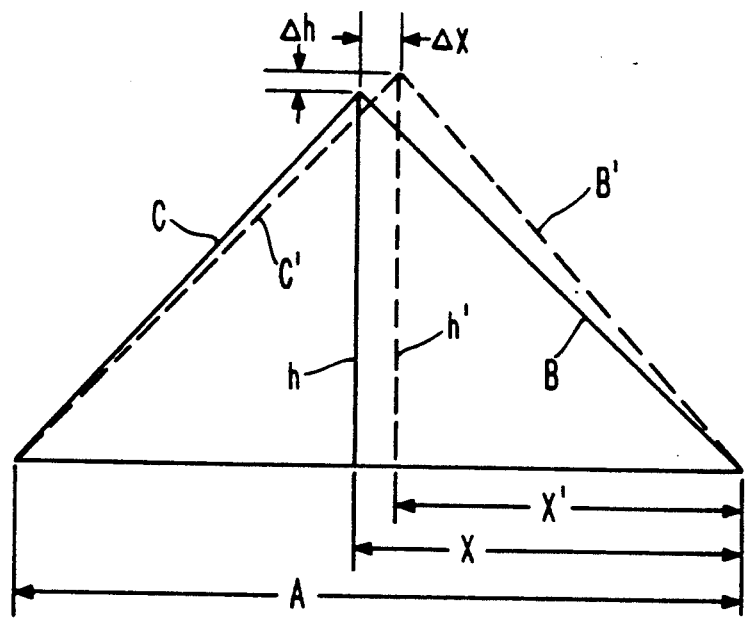
FIG. 9 is a schematic view, showing the parameters utilized to quantify deformation according to the method of the current invention.

According to the current invention, two small axially oriented holes are drilled in the inlet side of at least three of the blades 1 in the row, as shown in FIGS. 1–3. One hole 8 is drilled in the inlet face 13 of the shroud 7 in the vicinity of the leading edge 23 of the airfoil 2. By locating the hole 8 in the portion of the shroud inlet face 13 proximate the airfoil leading edge 23, rather than in the overhanging portion of the shroud remote from the leading edge, local shroud deformation will not affect the radial location of the hole 8 with respect to the blade root 3, thereby making it an ideal reference point for determining gross airfoil deformation. A second small hole 9 is drilled in the inlet face 15 of the blade root 3—specifically, in the bottom-most lug of the root. On the exit side of the same three blades 1, three additional small axially oriented holes are drilled, as shown in FIGS. 2 and 9. Two of these holes 10 and 11 are drilled in the exit face 14 of the shroud 7, as shown in FIG. 9. Hole 10 is located in the portion of the shroud 17 in the vicinity of the trailing edge 24 of the airfoil 2, thereby ensuring that local shroud deformation will not affect the radial location of the hole 10 with respect to the blade root 3, as previously discussed with respect to hole 8. By contrast, hole 11 is located in the overhanging portion 18 of the shroud 7 remote from the airfoil 2 so that it can be used as a reference point for determining local shroud deformation, as discussed further below. As shown in FIG. 2, a third small hole 12 is drilled in the exit face 16 of the blade root 3—again in the bottom-most lug of the root.

Figure 2A:
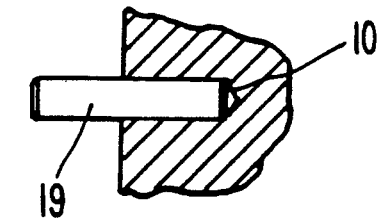
FIG. 2(a) is as enlarged view of the portion of FIG. 2 enclosed by the circle marked IIa, after a dowel has been inserted into the hole.

It is important to note that, according to the current invention, all of the holes 8–12 are located in low stress areas of the blade 1 so that the mechanical integrity of the blade is not jeopardized by the aforementioned modifications. Moreover, to facilitate using the holes 8–12 as reference points for obtaining reliable and repeatable measurements of blade geometry, a small tight fitting dowel 19 can be temporarily inserted into each hole, as shown in FIG. 2(a), when the measurements are to be taken.

As shown in FIG. 3, the modified blades 1 are installed in the blade row so that, preferably, the middle blade is disposed equidistantly between the other two blades. According to the method of the current invention, measurements are taken using the holes 8–12 as reference points at a first point in time, preferably at initial assembly of the rotor 4. As shown in FIG. 3, these measurements comprise (i) the distances, designated $C_i$ and $B_i$ in FIG. 3, between the holes 9 in the inlet faces of roots 3 of the two outer blades and the hole 8 in the inlet face of the shroud 7 of the middle blade, (ii) the distances, designated $C_e$ and $B_e$, between the holes 12 in the exit faces of roots 3 of the two outer blades and the hole 10 in the exit face of the shroud 7 of the middle blade, and (iii) the distance $A_i$ between the holes 9 in the inlet faces of roots 3 of the outer blades and the distance $A_e$ between the holes 12 in the exit faces of the roots of the outer blades.

At initial assembly the value of these measurement can be compared to nominal design or typical values as a check to determine if the blades have been properly radially aligned. In addition, these measurements can be repeated at a second point in time, preferably after the turbomachine has operated for a considerable length of time, wherein permanent deformation is suspected. (Note that in the discussion that follows, the measurements taken at the second point in time are designated by primes.) By comparing A, B and C to A', B' and C' on both the inlet and exit sides, the type of deformation may be determined and its amount quantified.

Figure 6:
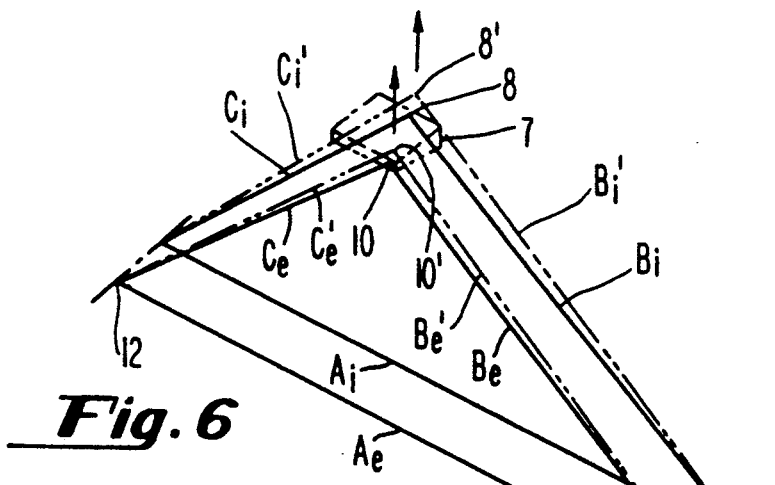
FIG. 6 is a schematic view, showing the effect of radial elongation type deformation on the measurements taken according to the method of the current invention.
Figure 7:
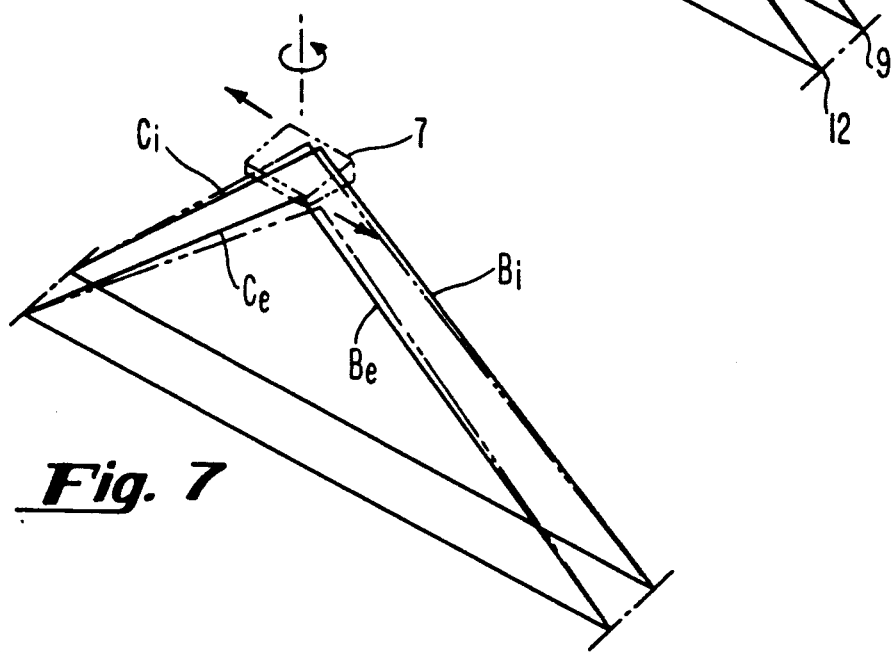
FIG. 7 is a schematic view, showing the effect of twist type deformation on the measurements taken according to the method of the current invention.
Figure 8:
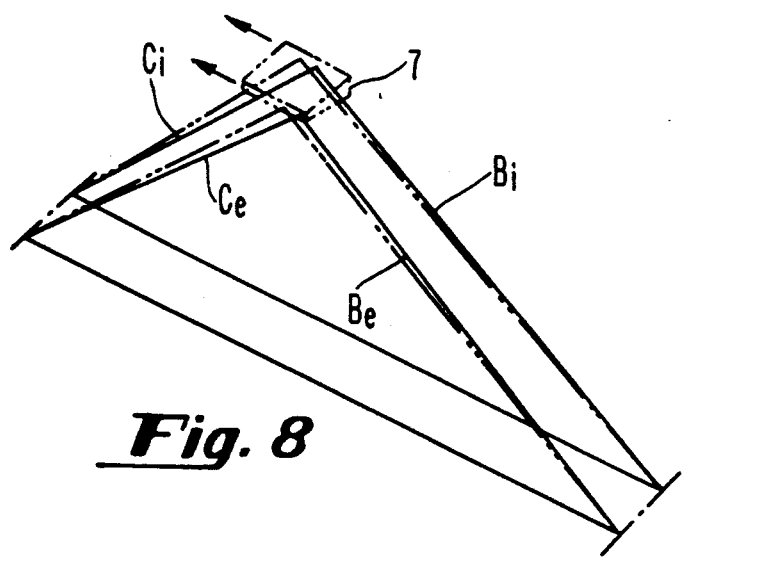
FIG. 8 is a schematic view, showing the effect of tangential lean type deformation on the measurements taken according to the method of the current invention.

According to the current invention, as shown in FIG. 6–8, the aforementioned measurements may be compared by forming triangles from A,B,C and again from A',B',C' on both the inlet and exit sides. (Note that in the discussion that follows, the values on the inlet and exit sides are indicated by the subscripts i and e, respectively.) The changes in the shapes of the triangles are indicative of the deformation the blade has undergone. According to the current invention, the type of deformation may be determined and its amount quantified by determining the change in the inlet and exit side triangles and then comparing the change in the inlet side triangle to the change in the exit side triangle. Specifically, the change between triangle $A_i, B_i, C_i$ and triangle $A_i', B_i', C_i'$ is determined and the change between triangle $A_e, B_e, C_e$ and triangle $A_e', B_e', C_e'$, is determined. The differences between these triangles are then compared to each other. By way of example only, these comparisons may be performed, using well known geometric relationships, by determining the height h of each triangle from its three sides A, B and C, as shown in FIG. 9. In addition, x, the projected length of side B on side A can also be determined for each triangle. As discussed further below, the change in these values, $\Delta h = h' - h$ and $\Delta x = x' - x$, can be used to identify and quantify the deformation.

Figure 10:
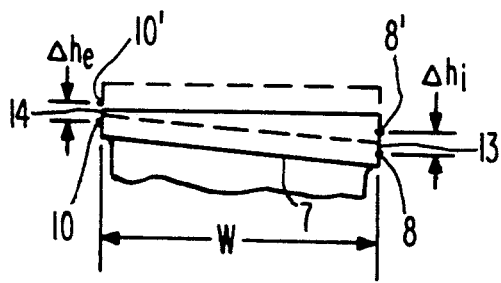
FIGS. 10 and 11 are schematic views, showing the effect of radial elongation and axial lean type deformations, respectively, on the position of the blade shroud when viewed from the side.

FIGS. 6 and 10 show the effect of radial elongation type deformation—whereby the airfoil more or less grows uniformly longer, thereby increasing its radial height—on the measurements according to the current invention. As shown in FIG. 10, this type of deformation will result in the heights of both the inlet and exit triangles, $\Delta h_i$ and $\Delta h_e$, respectively, undergoing an approximately equal increase.

The amount of radial elongation type deformation can be quantified by a single parameter $P_{re}$ by, for example, determining the average increase in the height of the inlet and exit triangles, so that:

$$P_{re} = (\Delta h_i + \Delta h_e)/2; [mm(inch)].$$

The larger $P_{re}$, the larger the radial elongation type of deformation.

Figure 11:
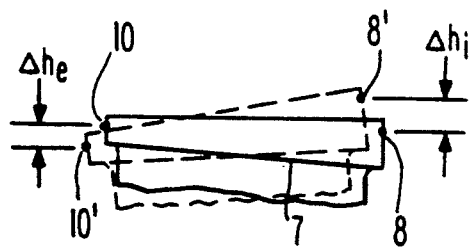

FIG. 11 shows the effect of axial lean type deformation, whereby the airfoil bends rearward about its base. This type of deformation will result in the height of the triangle increasing on the inlet side and decreasing on the exit side, so that $\Delta h_i$ will be positive and $\Delta h_e$ will be negative.

The amount of axial lean type deformation can be quantified by a single parameter $P_{al}$ by, for example, determining the differences between the changes in the height of the inlet and exit triangles and calculating:

$$P_{al} = arc \tan (\Delta h_i - \Delta h_e)/W; [degrees],$$

where W is the axial width of the shroud 7 as shown in FIG. 10. The larger $P_{al}$, the larger the axial lean type of deformation.

Figure 12:
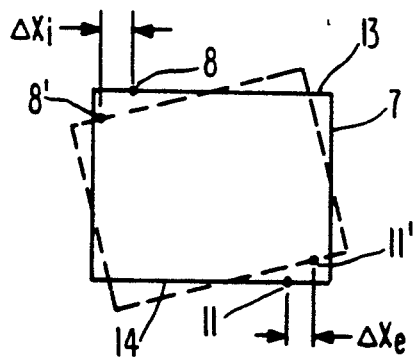
FIGS. 12 and 13 are schematic views, showing the effects of radial twist and tangential lean type deformations, respectively, on the position of the blade shroud when view from above.

FIGS. 7 and 12 show the effect of twist type deformation, whereby the airfoil rotates about its longitudinal axis. On the inlet side of the blade, this type of deformation will result in the measurements $C_i$ and $B_i$ each undergoing approximately equal but opposite changes—that is, $B_i$ will increase while $C_i$ will decrease. A similar, but reverse effect will occur on the exit side of the blade in that while $C_e$ and $B_e$ will each undergo approximately equal but opposite changes, as on the inlet side, $B_e$ will decrease whereas $C_e$ will increase. The result is that the projected length of B on the inlet side will increase so that $\Delta x_i$ will be positive, whereas the projected length of B on the exit side will decrease so that $\Delta x_e$ will be negative.

The amount of twist type of deformation can be quantified by a single parameter $P_t$ by, for example, determining the sum of the changes in the projected length x of side B of the inlet and exit triangles and calculating:

$$P_t = arc \tan (\Delta x_i + \Delta x_e)/W; [degrees].$$

The larger $P_t$, the larger the twist type of deformation.

Figure 13:
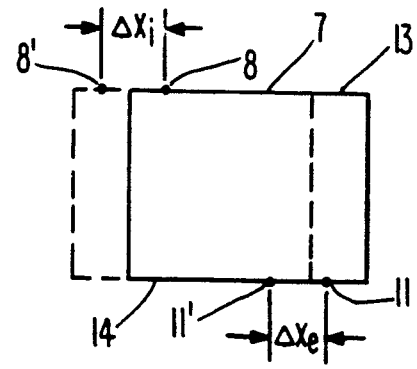

FIGS. 8 and 13 shows the effect of tangential lean type deformation, whereby the airfoil bends in the tangential direction about its base. On the inlet side of the blade, this type of deformation will result in the measurements $C_i$ and $B_i$ each undergoing approximately equal but opposite changes as discussed with respect to the twist deformation shown in FIG. 7—that is, $B_i$ will increase while $C_i$ will decrease. However, unlike the situation with twist deformation, tangential lean deformation will result in substantially the same effect occurring on the exit side of the blade in that $C_e$ and $B_e$ will each undergo approximately equal but opposite changes with $B_e$ increasing and $C_e$ decreasing. The result is that the projected length x of B will increase on both the inlet and exit sides.

The amount of tangential lean type of deformation can be quantified by a single parameter $P_{tl}$ by, for example, determining the average of the changes in the projected length x of side B of the inlet and exit triangles and calculating:

$$P_{tl} = (\Delta x_i + \Delta x_e)/2; [mm(inch)].$$

The larger $P_{tl}$, the larger the tangential lean type of deformation.

Thus, the method according to the current invention allows one to determine the type of deformation as well as quantify its amount. Note that it is not necessary that the parameters $P_{re}$, $P_{al}$, $P_t$ and $P_{tl}$ represent the precise magnitude of the deformation that has occurred. It is sufficient that they provide a relative indication of the amount of deformation. This relative indication, combined with experience and judgment, informs the decision whether to return the blades for additional service or take remedial action. Accordingly, those skilled in the art will appreciate that, within the teachings of the current invention, other parameters can be devised to quantify the amount of deformation based on the measured values A, B and C. With time, determining the creep curve, if creep is present, unique for each turbine, will be possible. Thus, the prevention of creep failure will be facilitated.

Figure 14:
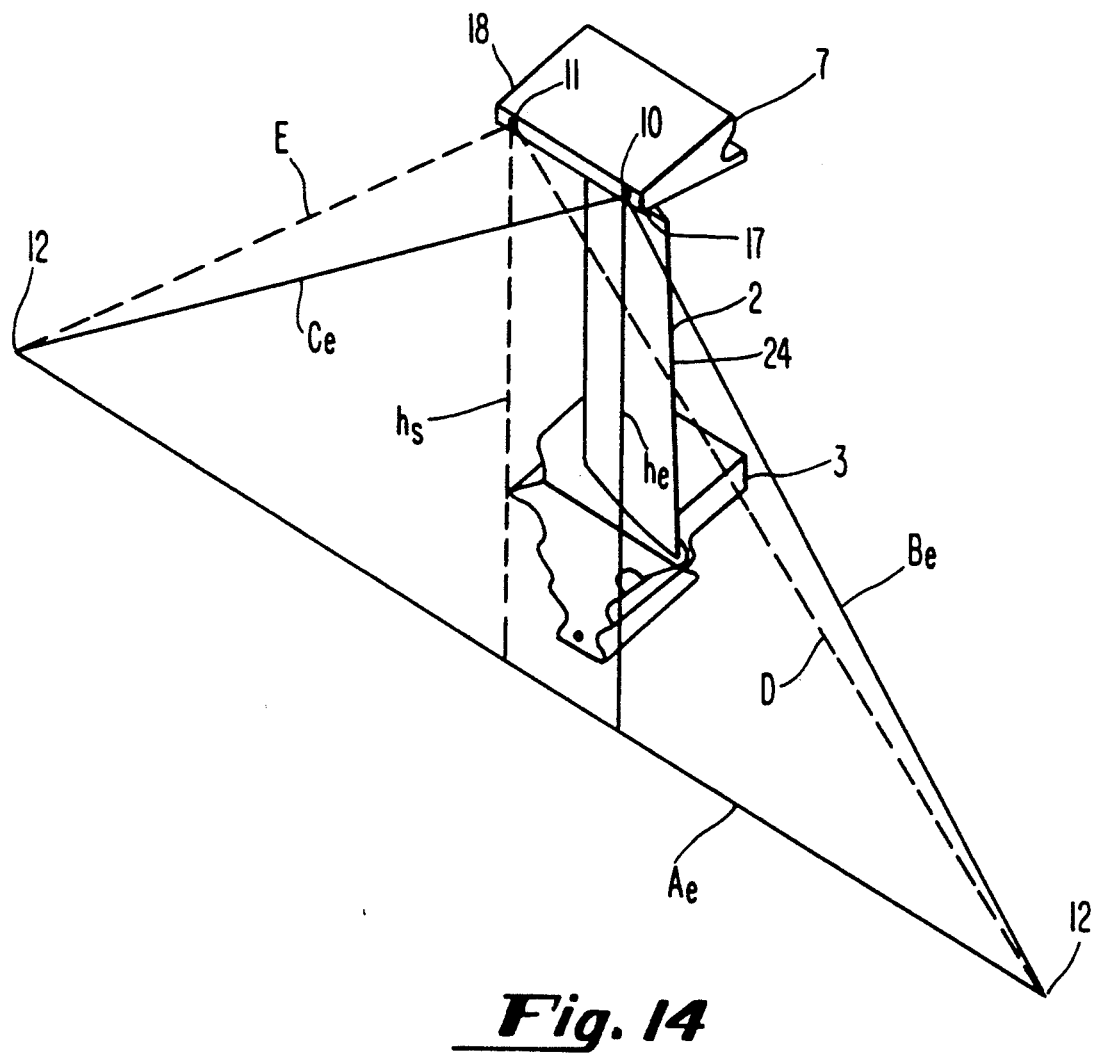
FIG. 14 is an isometric view similar to FIG. 3, showing the measurements taken according to the current invention to determine local shroud deformation.

In addition to determining the gross blade airfoil deformations of radial elongation, axial lean, twist and tangential lean, the current invention also allows one to determine local shroud deformation, such as the radial deformation on the overhanging portion 18 of the shroud 7, shown in phantom in FIG. 1. As shown in FIG. 14, at the first point in time, measurements are taken of the distances A, B and C, as before. In addition, the distances D and E between the holes 12 on the exit faces of the roots of the outer blades and the hole 11 in the exit face of overhanging portion of the shroud 7 is measured, as shown in FIG. 14. Based on these measurements, the heights $h_e$ and $h_s$ of the triangles formed by $A_e, B_e, C_e$ and $A_e, D, E$, respectively, may be determined. These measurements are repeated at a second point in time, after extended operation.

An increase in h indicates radial elongation of the blade. As previously discussed, hole 10 is located in the portion 17 of the shroud 7 proximate to the airfoil 2. As a result of the support provided by its close proximity to the airfoil, portion 17 of the shroud will not be expected to undergo local deformation. Thus, any increase in h will be the result of radial elongation. However, the portion 18 of the shroud 7 in which hole 11 is located is in the overhanging portion that is remote from the airfoil 2. Thus, the increase in $h_s$ will represent the combined effect of radial elongation of the airfoil as well as local shroud deformation. According to the current invention, any increase in $\Delta h_s$ greater than the increase in $\Delta h$ can be attributed to local shroud deformation.

It should be noted that the aforementioned measurements are taken in situ—that is, with the blades installed in the rotor. This considerably reduces the man hours and time associated with measuring the blade geometry by de-blading the rotor.

Although the current invention has been described with respect to an integral shrouded steam turbine blade, the invention is also applicable to other blades, as well as blades of other types of turbomachinery, such as gas turbines. Moreover, although the invention has been illustrated by using triangles formed by using the shroud reference mark of the middle blade as the vertex and the root reference marks of the two outer blades to form the base of the triangle, other triangulation methods could also be utilized. For example, the root reference mark of the middle blade could be used as the vertex and the shroud reference marks on the two outer blades could be used to form the base. In addition, the vertex could be formed using a reference mark on one of the outer blades, rather than the middle blade. Accordingly, the present invention may be embodied in other specific forms without departing from the spirit or essential attributes thereof and, accordingly, reference should be made to the appended claims, rather than to the foregoing specification, as indicating the scope of the invention.

I claim:

1. In a turbomachine having a plurality of blades arranged in a circumferentially extending row around a rotor, each of said blades having a proximal end affixed to said rotor and a distal end, a method of determining changes in the geometry of said blades as a result of operation of said turbomachine, comprising the steps of:
   a) forming (i) a first reference mark on said distal end of a first one said blades, (ii) a second reference mark on said proximal end of a second one of said blades, and (iii) a third reference mark on said proximal end of a third one of said blades;
   b) measuring the distances B and C from said first reference mark to said second and third reference marks, respectively, at a first point in time, re-measuring the distances B' and C' from said first reference mark to said second and third reference marks, respectively, at a second point in time; and
   c) comparing B and C to B' and C'.

2. The method according to claim 1, further comprising the steps of measuring the distances A and A, between said second and third reference marks at said first and second points in time, respectively, and wherein the step of comparing B and C to B' and C' comprises forming a first triangle from A,B,C and a second triangle from A',B',C' and determining the difference between said first triangle and second triangle.

3. The method according to claim 1, wherein each of said blades has an inlet side disposed axially upstream of an exit side, and wherein the step of forming said first, second and third reference marks comprises forming each of said reference marks on said inlet side.

4. The method according to claim 3, further comprising the steps of:
   a) forming (i) a fourth reference mark on said distal end of said first blade on said exit side, (ii) a fifth reference mark on said proximal end of said second blade on said exit side, and (iii) a sixth reference mark on said proximal end of said third blade on said exit side;
   b) measuring the distances $B_e$ and $C_e$ from said fourth reference mark to said fifth and sixth reference marks, respectively, at said first point in time, remeasuring the distances $B_e'$ and $C_e'$ from said fourth reference mark to said fifth and sixth reference marks, respectively, at said second point in time; and
   c) comparing $B_e$ and $C_e$ to $B_e'$ and $C_e'$.

5. The method according to claim 4, further comprising the steps of:
   a) measuring the distances A and A' between said second and third reference marks at said first and second points in time, respectively;
   b) measuring the distances $A_e$ and $A_e'$ between said fifth and sixth reference marks at said first and second points in time, respectively;
   c) wherein the step of comparing B and C to B' and C' comprises forming a first triangle from A,B,C and a second triangle from A',B',C' and determining the difference between said first and second triangles; and
   d) wherein the step of comparing $B_e$ and $C_e$ to $B_e'$ and $C_e'$, comprises forming a third triangle from $A_e, B_e, C_e$ and a fourth triangle from $A_e', B_e', C_e'$, respectively, and determining the difference between said third and fourth triangles.

6. The method according to claim 5, further comprising the step of comparing said difference between said first and second triangles to said difference between said third and fourth triangles.

7. The method according to claim 1, wherein the step of forming said first, second and third reference marks comprises forming first, second and third holes.

8. The method according to claim 7, wherein the step of forming said first, second and third reference marks further comprises the step of inserting first, second and third dowels into said first, second and third holes, respectively, and wherein the steps of measuring said distances B and C and said distances B' and C' comprises at each of said times the step of measuring the distances from said first dowel to said second and third dowels, respectively.

9. The method according to claim 1, wherein each of said blades comprises an airfoil portion having proximal and distal ends and a shroud formed on said airfoil distal end, each of said shrouds having a radial face, a first portion of said shroud radial face being proximate said airfoil distal end and a second portion of said shroud radial face being remote from said airfoil distal end, and wherein said first reference mark is disposed in said first portion of said shroud radial face.

10. The method according to claim 9, further comprising the steps of:
   a) forming a fourth reference mark on said second portion of said shroud radial face of said first blade; and
   b) measuring the distances D and E from said fourth reference mark to said second and third reference marks, respectively, at said first point in time, re-measuring the distance D' and E' from said fourth reference mark to said second and third reference marks at said second point in time; and c) comparing D and E to D' and E'.

11. The method according to claim 10, further comprising the steps of measuring the distances A and A' between said second and third reference marks at said first and second points in time, respectively, and wherein the step of comparing D and E to D' and E' comprises forming a first triangle from A,D,E and a second triangle from A',D',E' and determining the difference between said first triangle and second triangle.

12. The method according to claim 1, wherein said first blade is disposed between said second and third blades within said row.

13. In a turbomachine having a plurality of blades arranged in a circumferentially extending row around a rotor and through which a working fluid flows, each of said blades having an inlet side disposed upstream of an exit side, each of said blades having a root portion attached to said rotor and an airfoil portion having a proximal end affixed to said root and a distal end on which a shroud is affixed, said blade airfoils being subject to deformation as a result of operation of said turbomachine, said deformation including tangential lean type deformation, axial lean type deformation, radial elongation type deformation and twist type deformation, a method of determining the amount and type of said distortion comprising the steps of:

a) forming first and second reference marks on said inlet and exit sides, respectively, of a first one said blades at said shroud;

b) forming third and fourth reference marks on said inlet and exit sides, respectively, of a second one of said blades at said root;

c) forming fifth and sixth reference marks on said inlet and exit sides, respectively, of a third one of said blades at said root, said first blade being disposed between said second and third blades within said row;

d) measuring the distances $B_i$ and $C_i$ from said first reference mark to said third and fifth reference marks, respectively, at a first point in time;

e) measuring the distances $B_e$ and $C_e$ from said second reference mark to said fourth and sixth reference marks, respectively, at said first point in time;

f) re-measuring the distances $B_i'$ and $C_i'$ from said first reference mark to said third and fifth reference marks, respectively, at a second point in time;

g) re-measuring the distances $B_e'$ and $C_e'$ from said second reference mark to said fourth and sixth reference marks, respectively, at said second point in time; and h) comparing $B_i$, $B_e$, $C_i$, $C_e$ to $B_i'$, $B_e'$, $C_i'$, $C_e'$.

14. The method according to claim 13, wherein said first blade is disposed approximately equidistantly between said second and third blades.

15. The method according to claim 13, further comprising the steps of:

a) measuring the distances $A_i$ and $A_i'$ between said third and fifth reference marks at said first and second points in time, respectively;

b) measuring the distances $A_e$ and $A_e'$ between said fourth and sixth reference marks at said first and second points in time, respectively; and c) wherein the step of comparing $B_i$, $B_e$, $C_i$, $C_e$ to $B_i'$, $B_e'$, $C_i'$, $C_e'$ comprises forming first, second, third and fourth triangles from $A_i,B_i,C_i$, from $A_i',B_i',C_i'$, from $A_e,B_e,C_e$, and from $A_e',B_e',C_e'$, respectively; and d) comparing said first triangle to said second triangle and said third triangle to said fourth triangle.

16. The method according to claim 15, wherein the step of comparing said first triangle to said second triangle and said third triangle to said fourth triangle comprises the step of determining said radial elongation type deformation by determining the difference in the height $\Delta h_i$ between said first and second triangles and the difference in height $\Delta h_e$ between said third and fourth triangles.

17. The method according to claim 15, wherein in the step of comparing said first triangle to said second triangle and said third triangle to said fourth triangle comprises the step of determining said tangential lean type deformation by:

a) determining the projected length $x_i$ of $B_i$ on $A_i$, the projected length $x_e$ of $B_e$ on $A_e$, the projected length $x_i'$ of $B_i'$ on $A_i'$, and the projected length $x_e'$ of $B_e'$ on $A_e'$; and b) determining the difference $\Delta x_i$ between $x_i$ and $x_i'$ and the difference $\Delta x_e$ between $x_e$ and $x_e'$.

18. A steam turbine comprising:

a) a rotor;

b) a plurality of side-entry blades arranged in a circumferentially extending row around said rotor, each of said blades having a root portion received in an axial groove formed in said rotor so as to be attached to said rotor and an airfoil portion having a proximal end affixed to said root and a distal end on which a shroud is affixed and, said root portions and said shrouds having exposed side surfaces when said blades are mounted on said rotor, said blade airfoils being subject to deformation as a result of operation of said turbomachine; said blades having means for allowing determination of the amount of said distortion, said distortion determining means including (i) a first reference mark on at least one side surface of said shroud of a first one of said blades, (ii) a second reference mark on at least one side surface of the root of a second one of said blades, and (iii) a third reference mark on at least one side surface of the root of a third one of said blades, said first blade being disposed between said second and third blades within said row.

19. The steam turbine according to claim 18, wherein each of said first, second and third reference marks comprise:

a) a hole formed in the side surfaces of the shrouds and the root portions of said blades, b) said holes being sized for the reception of dowel pins facilitating the determination of distances between said holes.

20. The steam turbine according to claim 18, wherein:

a) said deformation includes tangential lean type deformation, radial elongation type deformation and twist type deformation;

b) each of said blades has an inlet side disposed axially upstream of an exit side, said first, second and third reference marks being disposed on said inlet side; and c) said distortion determining means further comprises a fourth reference means disposed on said shroud of said first blade at said exit side, and fifth and sixth reference marks disposed on said roots of said second and third blades, respectively, at said exit side.

* * * * *